United States Patent [19]
Palis

[11] 3,744,408
[45] July 10, 1973

[54] COCONUT PARING MACHINE

[75] Inventor: Julian O. Palis, San Pablo City, Philippines

[73] Assignee: General Foods Corporation, White Plains, N.Y.

[22] Filed: June 9, 1971

[21] Appl. No.: 151,408

[52] U.S. Cl. .............................................. 99/595
[51] Int. Cl. .............................................. A23n 7/00
[58] Field of Search ................... 146/7, 43 A, 43 R; 242/3; 144/4, 2.75, 33; 90/15.1

[56] References Cited
UNITED STATES PATENTS

| | | | |
|---|---|---|---|
| 1,951,804 | 3/1934 | MacDougall | 146/7 |
| 2,562,756 | 7/1951 | Weston et al. | 242/3 |
| 3,173,336 | 3/1965 | Cull | 90/15.1 |

*Primary Examiner*—Willie G. Abercrombie
*Attorney*—Bruno P. Struzzi, Thomas V. Sullivan et al.

[57] ABSTRACT

A paring machine designed to impart dual rotation to an object to be pared whereby the object is rotated simultaneously about two perpendicular axes of rotation at different speeds and contacted with a cutting device. The machine consists of four principal assemblies: 1) feeding and positioning device; 2) assembly adapted to receive, grip, rotate and eject the object to be pared; 3) stationary cutter assembly for removing the skin of the object as the object rotates; 4) programming and pneumatic control means for actuating the assemblies in the proper step sequence and time durations.

10 Claims, 5 Drawing Figures

INVENTOR.
JULIAN P. PALIS

Michael J. Tully
ATTORNEY

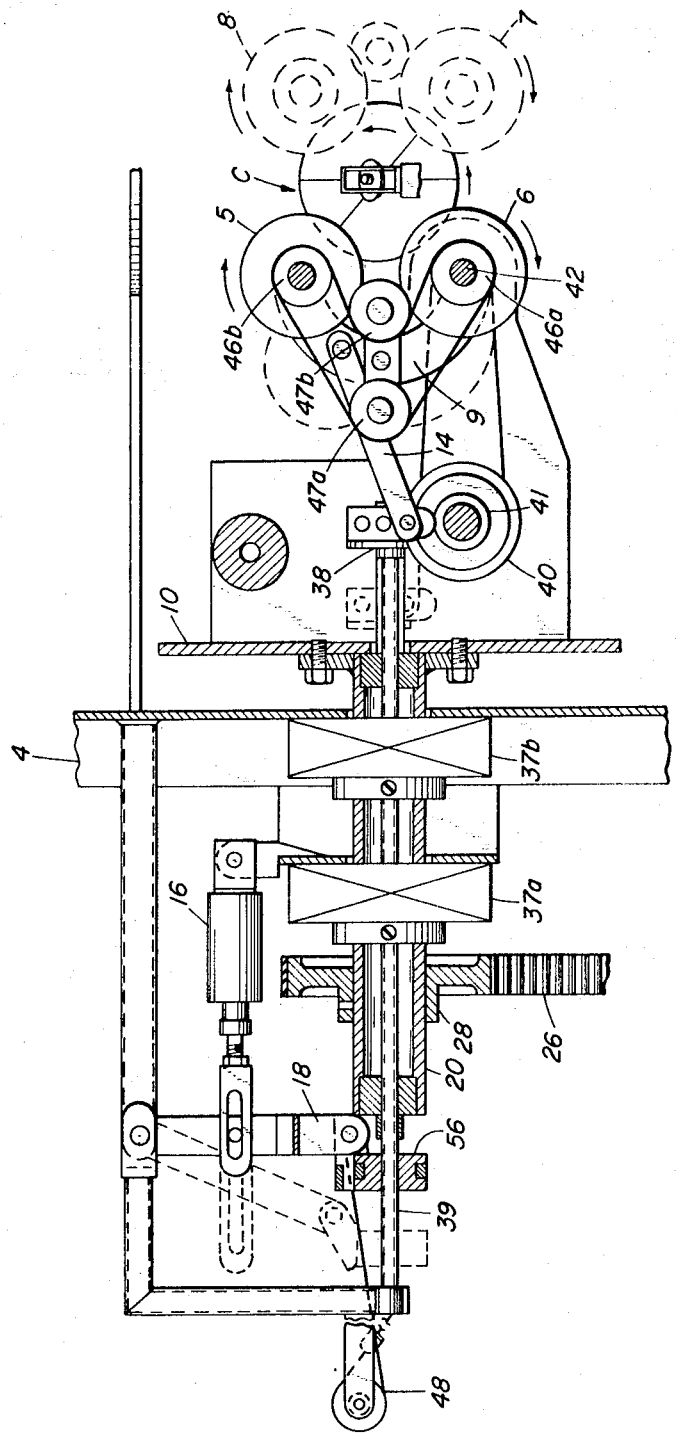

COCONUT PARING MACHINE

BACKGROUND OF THE INVENTION

In preparing coconuts for use, the usual procedure is to first remove the husk, then to remove the hard shell and finally peel off the tough brown skin which forms a protective covering for the meat. These steps have traditionally been carried out by a manual operation whereby the shell is split and the brown skin cut or shaved from the meat body. However, the manual operation is necessarily slow and a large number of skilled workers are required in order to meet even modest production goals. In addition, extreme care must be exercised in the separation of the brown skin from the meat to minimize the amount of white meat taken with the skin.

Various processes and machines have been developed to mechanize the shelling operation. For example, U.S. Pat. No. 3,340,918 discloses machine and process for effectively separating the shell from the body portion of a coconut, leaving the meat body with the brown skin tightly adhered thereto. Thereafter, the brown skin may then be removed either manually or by a mechanized paring operation.

There are several machines in the prior art designed to pare brown skin from the surface of a shelled coconut. Most of these devices involve a two step operation wherein the shelled nut is secured by gripping means at one end while the other end is exposed to a cutting or paring device. The process is then reversed with the nut being secured at the pared end while the opposite end is subjected to the paring operation; Cf. U.S. Pat. Nos. 1,490,493; 1,503,390; 1,951,804; and 2,044,418. Another machine of the prior art operates by moving the shelled coconut to four stations where the nut is contacted with a series of overlapping disc knives until paring is completed; Cf. U.S. Pat. No. 2,862,534. These and other paring devices have not met with commercial success because their operation has not proved to be economically feasible. The fact is that up to the present time almost all coconuts are pared commercially by the manual method.

SUMMARY OF THE INVENTION

This invention relates to a process for performing work on the surface of a rounded or generally symmetrical three dimensional object in a single continuous operation whereby the entire surface of the object is exposed to a given work operation. This is accomplished by simultaneously subjecting the object to rotational motion in two directions about mutually perpendicular axes of rotation and contacting the rotating surface of the object with a workpiece.

This invention also relates to a novel machine for performing work on the surface of a rounded or generally symmetrical object. In particular, this invention relates to a machine designed to grip and simultaneously rotate a rounded or generally symmetrical three dimensional object about two mutually perpendicular axes of rotation and subject the surface of said object to a work operation while it is rotating.

More specifically, this invention is directed toward a process and machine for removing skin or peelings from fruit, such as a coconut, whereby the fruit is simultaneously rotated about two mutually perpendicular axes of rotation, and the surface contacted with a yieldingly mounted, stationary cutting device while the fruit is rotating.

The invention will be particularly described using the embodiment wherein the work object is a husked coconut. However, it is emphasized that the invention is equally applicable where the work object is any round or generally symmetrical fruit or vegetable having a thin skin to be pared such as a turnip, citrus fruit, apple and the like. The invention is also applicable for operations other than the paring of fruit or vegetables. For example, other rounded or generally symmetrical objects may be subjected to etching or polishing operations by using the machine of this invention and substituting a suitable tool for the cutting device used to pare fruit or vegetables.

DETAILED DESCRIPTION OF THE INVENTION

The Drawings

Referring now to the drawings,

FIG. 3 is an elevation view showing opening and closing mechanism of nut holder assembly.

The machine consists of four principal assemblies or mechanisms: (A) feeding and positioning device; (B) nut holder assembly for gripping, rotating and ejecting the coconut; (C) stationary cutter assembly for removing the brown skin of the nut; (D) programming and pneumatic control means for actuating the assemblies in the proper step sequence and time durations.

Figure 1:
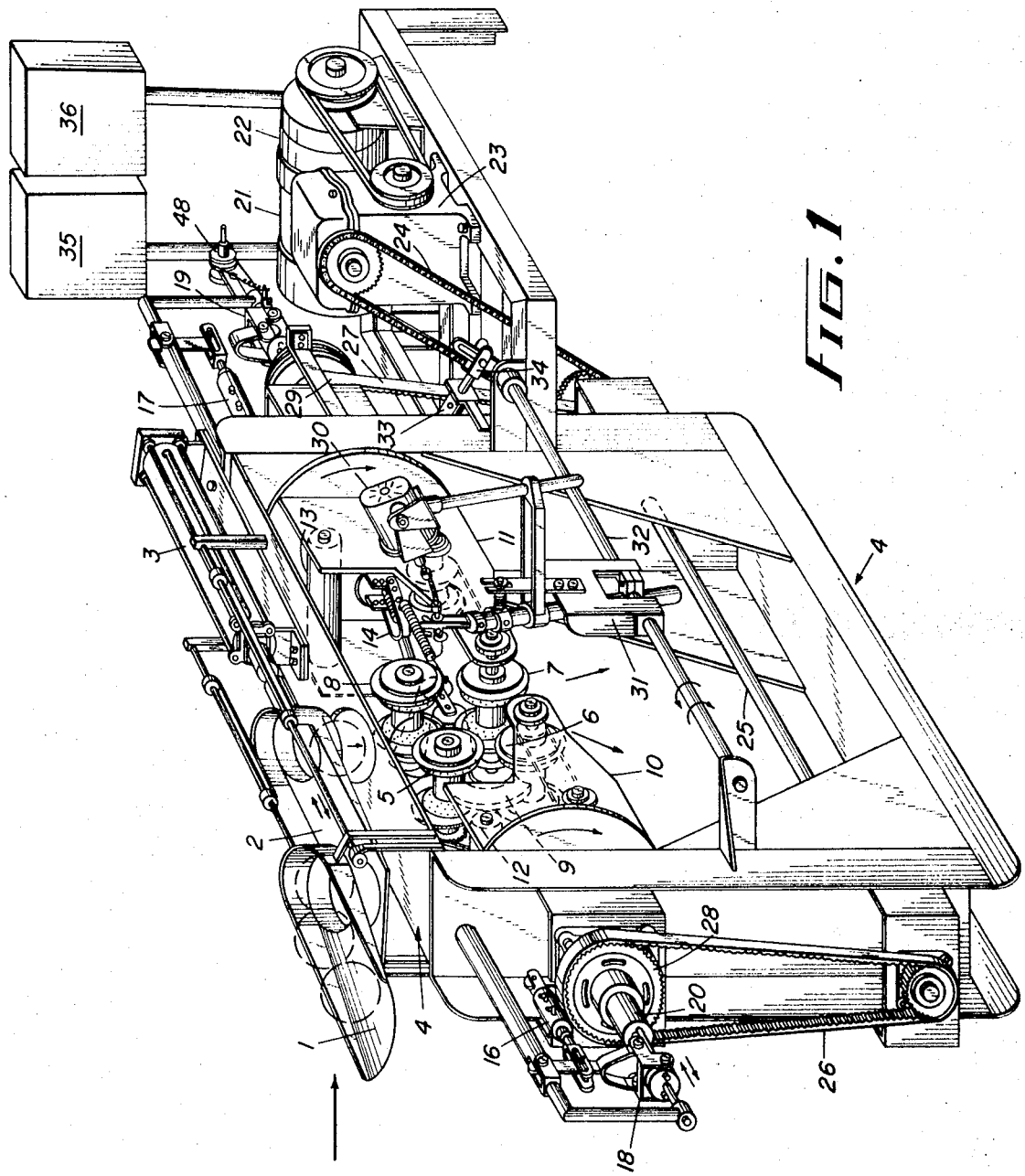
FIG. 1 is a side partial elevation view of the machine.

Referring to FIG. 1, the de-shelled whole coconut with brown skin is placed on feeder chute 1. A plurality of nuts may by placed on the chute one after the other. Below this is feeding device 2 mounted for horizontal movement and actuated by air cylinder 3. At the beginning of the feeding stroke the annular opening of feeding device 2 aligns with the annular opening of the feeder chute 1 causing the nut to drop through both openings to rest on the top of the machine frame 4. At the end of the feeding stroke the nut is gravity fed through an annular opening in frame 4 positioned directly over nut holder drive rolls 5, 6, 7 and 8 which are in the open position. The nut comes to rest on the four base drive rolls 6 and 7.

The nut holder drive rolls comprise 4 pairs of tapered disc shaped rolls arranged in an octahedral configuration, each pair being rotatably shaft mounted on supporting members 9. The two left pairs of drive rolls are shown mounted on supporting member 9 in FIGS. 1 and 3. The right drive rolls are mounted in the same fashion. Each pair of drive rolls consists of two discs having inwardly tapered circumferences. The discs are shaft spaced such that they roughly conform to the surface of the object to be pared. The left and right disc supporting members, of which only left member 9 is shown, are pivotally mounted on nut holder assembly frames 10 and 11 at the bearing shaft of lower drive rolls 6 and 7. Balancing weights 12 and 13 are also attached to nut holder assembly frames 10 and 11 to provide for smooth operation as the entire nut holder assembly rotates.

The nut holder drive rolls are pivotally opened and closed through spring biased clevis 14 linked with supporting members 9. Clevis 14 is in turn linked with nut holder opening and closing rods 15a & 15b, shown in FIG. 2, which are actuated by air cylinders 16 and 17 through nut closing and release linkages 18 and 19.

Nut holder assembly frames 10 and 11 are rotatably mounted on machine frame 4 through the nut holder assembly drive shafts. Only left drive shaft 20 is shown. Driving power comes from electric motor 21, magnetic clutch and brake 22, speed reducer 23, roller chain drive 24, common shaft 25, silent chain drives 26 and 27, and silent chain sprockets 28 and 29 which are rigidly attached to the nut holder assembly drive shafts.

Figure 4:
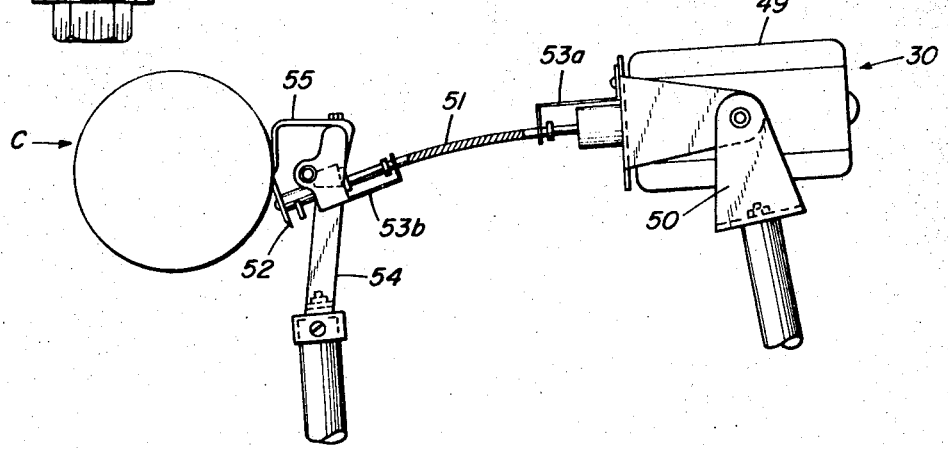
FIG. 4 is a side view of the rotary live cutter assembly.

The live cutter assembly 30, discussed in more detail in FIG. 4, is shaft mounted by the cutter drive assembly holder 31 to pivot with shaft 32 actuated by air cylinder 33 and connecting linkage 34 for engaging and retracting the cutter assembly.

The mechanical movement of all working parts is coordinated by pneumatic control panel 35 and programming circuitry 36.

Figure 2:
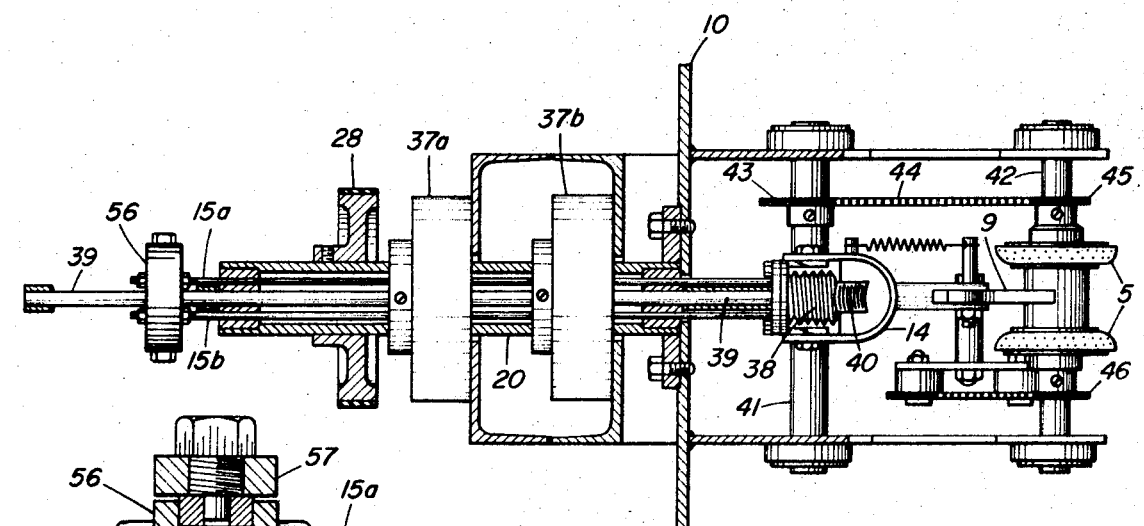
FIG. 2 is a plan section view showing the left section of the nut holder assembly and drive mechanism.

FIG. 2 is a plan section view showing the left section of the nut holder assembly and drive mechanism in greater detail. Nut holder assembly 10 as shown is rigidly attached to nut holder assembly drive shaft 30, which is mounted for rotation on ball bearing flanged units 37a and 37b. Left upper drive rolls 5 are shown with short, for example one-sixteenth inch, spikes embedded in the tapered surfaces. These spikes prevent slippage of the coconut as it turns. The drive rolls are powered by means of worm 38 rigidly attached to drive roll main shaft 39 and worm gear 40 rigidly attached to gear and sprocket shaft 41. Drive roll main shaft 39 and worm 38 are held fixed within the rotating nut holder assembly drive shaft 30 such that driving motion is imparted to gear and sprocket shaft 41 by the rotation of gear 40 around fixed worm 38. Gear and sprocket shaft 41 in turn powers nut holder drive shaft 42 through drive sprocket 43, chain 44 and drive roll sprocket 45.

Figure 2A:
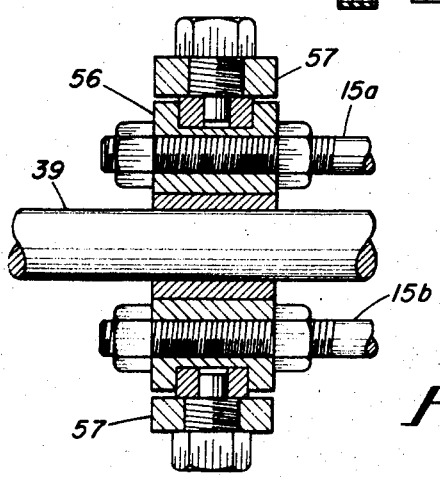
FIG. 2A is a partial sectional view of shifter spool 56.

Inside the nut holder assembly drive shaft 20 are nut holder opening and closing rods 15a and 15b and drive roll main shaft 39. At one end of 39 elements 15a and 15b are linked to the upper drive roll linkage and clevis 14. At the other end is a fixed shifter spool 56 of nut opening and release linkage 18. Shifter spool 56, shown in FIG. 2A, is a cylindrical piece where elements 15a and 15b are rigidly connected. It has also a center hole from which element 39 protrudes. The central circumferal area of the cylinder is grooved. Over the groove is bushing 57 where linkage 18 is connected. During the machine operation, shifter spool 56 rotates along with rods 15a and 15b and drive shaft 20 while the shifter spool bushing 57 and linkage 18 remain fixed. Drive roll main shaft 39 is held fixed within rotating nut holder assembly drive shaft 20.

The pivoting of drive rolls occurs through horizontal motion of nut holder opening and closing rods 15a and 15b linked to spring biased clevis 14 which is in turn linked to left supporting member 9. This linkage is shown in more detail in FIG. 3.

Although only the left section of the nut holder assembly and drive mechanism is shown in FIG. 2, the same parts and relationship of parts is associated with the right section of the nut holder assembly.

FIG. 3 is an elevation view showing the opening and closing mechanism of the left nut holder assembly and the drive roll power mechanism of the left nut holder assembly. As shown, the drive rolls are in the closed position. The open position is shown by the dotted lines and occurs by actuation of air cylinder 16 on linkage 18, rods 15a and 15b, clevis 14, and drive roll shaft supporting member 9. Also shown is drive roll main shaft 39 within nut holder assembly drive shaft 20, worm 38, worm gear 40 and clevis 14. The drive rolls are powered by a chain drive operating through shaft sprockets 46a and 46b located on the respective drive roll shafts and idler sprockets 47a and 47b mounted on drive roll shaft supporting member 9. Also shown is coconut C held within the drive rolls being operated upon by live cutter assembly disc 52, explained in more detail in FIG. 4. Although only the left nut holder actuating assembly is shown, the same parts, assembly and driving mechanism are associated with the right nut holder assembly.

It is preferred to incorporate a paring time compensator potentiometer 48 (shown in FIGS. 1 and 3) which is mechanically linked to holder shaft to extend or retard the length of time the cutter engages the coconut to prevent incomplete paring or overlapping. This device operates in conjunction with a solid state adjustable time delay relay. Element 48 is a wire-woven rotary potentiometer. The resistor of the potentiometer is connected in series with a timing relay. As shown in the drawings, a small pulley is directly connected to the shaft of the potentiometer. The pulley and potentiometer are fixed to the nut opening and closing linkage 18. A small wire and coil spring is connected to the stationary element 39 and the other end is wrapped around the pulley. Traverse movement of elements 15a and 15b will rotate the pulley and potentiometer, thereby varying the electrical resistance in series with the timing relay. When a larger nut is gripped by the drive rolls, element 18 moves backward thereby rotating the potentiometer to add more electrical resistance in series with the timing relay. The additional resistance lengthens the time of actual engagement of the cutter with the nut. Paring a smaller nut will correspondingly shorten the time of actual cutter engagement with the nut.

FIG. 4 is a side view of the rotary live cutter assembly 30. The assembly is mounted as depicted and explained in FIG. 1. The assembly comprises cutter drive motor 49, self aligning drive motor holder 50, flexible drive shaft 51 and attached thereto rotary cutting disc 52. Preferably disc 52 is a 1 inch diameter disc having a sharp serrated edge. Flexible drive shaft 51 is stabilized by shaft guides 53a attached to the drive motor housing and 53b attached to self aligning rotary cutter holder 54. These shaft guides loop around flexible drive shaft 51 and prevent lateral motion of the drive shaft. Self aligning rotary cutter holder 54 is mounted on shaft 32 along with the cutter assembly holder 31 as shown in FIG. 1 such that holder 54 and cutter 30 pivot together on shaft 32. The depth of cut into the surface of coconut C is controlled by setting adjustable paring thickness guide 55 which follows the contour of the nut, with respect to the desired protrusion of the circular cutting disc.

MACHINE OPERATION

The paring action is described as follows:

After the coconut is fed through the annular opening in frame 4, as described above the nut drops on the nut holder drive rolls which are in the open position. This open position occurs when the two pairs of drive rolls 5 and 8 are pulled backwards by air cylinders 16 and 17 through linkage 18, shifter spool 56 rods 15a and 15b, and clevis 14. The pivot of drive rolls is at the bearing shafts of drive rolls 6 and 7 attached to nut holder frames 10 and 11 respectively. The drive rolls then close gripping the nut slightly. The closing occurs by a release of air cylinders 16 and 17 and the action of a tension spring linking clevis 14 to nut holder supporting frame 9. This mechanism for the left nut holder assembly is shown in FIG. 2.

Subsequent to the gripping of the nut by the drive rolls, the nut holder assemblies mounted on nut holder assembly frames 10 and 11 rotate at about 60 rpm on the drive shafts. Left drive shaft 20 is shown in FIGS. 2 and 3. As the entire nut holder assembly rotates, the drive rolls also rotate slowly powered by the action of stationary worm 38 on worm gear 40, which revolves with the nut holder assemblies. The rotation of the drive rolls turns the nut which is centrally positioned among the 8 drive rolls and gripped by the short spikes embedded in the tapered surfaces of the drive rolls. The drive rolls are set to rotate at a speed such that the coconut rotates at about 2 rpm. At this point the coconut is being subject to rotation in two different directions about two approximately mutually perpendicular axes of rotation. One axis is the axis of rotation of the nut holder assemblies 10 and 11; the other axis is the axis of rotation of coconut as it is being turned by the drive rolls. The axes of rotation do not necessarily intersect inasmuch as the axis of rotation of the nut holder assembly may lie on a plane parallel to and outside of the plane on which the axis of rotation of the coconut is located. Regardless of whether these axes lie on the same or different planes however, these axes form an angle of about 90° when transposed to intersect. Thus, the term perpendicular refers to those situations where the axes actually intersect as well as the situation where they intersect when transposed.

As indicated above, the preferred relative rates of rotation are 60 rpm. for the nut holder assembly and 2 rpm. for the coconut, or a 30:1 ratio. This relative ratio of rotation may be varied depending upon the nature of the work operation, size of the cutter disc and smoothness or contour of the work object by choosing the proper gear ratios between worm gear 40 and fixed worm 38. With respect to the paring of a coconut, the most effective paring is accomplished when the nut holder assembly is set to rotate within the range of 30 to 90 rpm. and the coconut set to rotate within the range of 1 to 3 rpm.

After a delay of a few seconds from the time the nut holder assemblies and drive rolls begin to rotate, cutter disc 52, driven by high speed cutter drive motor 49 through flexible shaft 51, and cutter guide 55 engage the surface of the rotating coconut slightly by actuation of air cylinder 33 through connecting linkage 34 and shaft 32. The cutter is set to operate at about 8,000 rpm. The cutter guide is designed to enable the rotating cutter disc to remove the brown skin of the nut even if there are small cracks or holes on he nut surface. The nut need not be perfectly centered within the drive rolls as the cutter assembly is yieldingly mounted to follow the contour or eccentricities of the revolving nut.

The initial cut after contact of the cutting disc with the nut surface is a circumferal stripe which broadens into an X-shaped cut as the operation proceeds. The nut is half pared in opposite quadrants after one-quarter revolution of the nut, and completely pared after one-half revolution of the nut. Thus, at speeds of 60 rpm. for the nut holder assembly and 2 rpm. for the nut, the nut is completely pared in 15 seconds actual paring time.

After the nut is completely pared, the cutter and cutter assembly disengage the nut surface. While the nut holder assembly is revolving, the left and right nut holder drive rolls open and the pared coconut is discharged by gravity. The nut holder assembly then stops with the drive rolls in open and upright position ready to receive another coconut.

The operational sequence is controlled by a step switch, electronic timers and relays such that the machine operates in the following sequence.

1. Feeder moves forward — feed one coconut.
2. Nut holder closes — nut is gripped by drive rolls.
3. Holder rotates — nut holder assembly and coconut rotate.
4. Cutter engages nut — cutter starts paring action.
5. Cutter disengages nut — paring action stops.
6. Nut holder opens — pared nut is discharged.
7. Nut holder stops — holder stops ending paring cycle.

Various modifications will occur to those skilled in the art in the configuration and disposition of the component elements going to make up the invention as a whole, as well as the use to which the machine is put, and no limitation is intended by the phraseology of the foregoing specification or illustrations in the accompanying drawings, except as indicated in the appended claims.

What I claim is:

1. A machine suitable for performing work on the surface of a three dimensional object having a curved surface comprising a first means adapted to hold and rotate said object about a first axis, said first means carried by and incorporated into a second means adapted to rotate said first means and said object about a second axis of rotation in a direction such that the second axis of rotation of said object and said first means is approximately perpendicular to the first axis of rotation of said object, means mounted for engagement and disengagement with the surface of said object as it rotates about said first and second axes of rotation, and a means for coordinating the mechanical movement of said first and second means such that the entire surface of said object can be worked upon by said third means.

2. The machine of claim 1 wherein the first means comprises four pairs of spaced rolls arranged in an octahedral configuration such that each roll may contact the surface of said object.

3. The machine of claim 2 wherein at least one pair of said spaced rolls includes means for moving said pair of spaced rolls toward and away from at least one other pair of said spaced rolls.

4. The machine of claim 2 wherein at least one pair of spaced rolls is connected to driving means for rotating said rolls about their central common axis.

5. A machine suitable for performing work on the surface of a three dimensional object having a curved surface comprising a first means adapted to accept, grip, rotate said object about a first axis of rotation, and discharge said object, said first means comprising four pair of mechanically driven spaced rolls arranged in an octahedral configuration such that each roll may contact the surface of said object as the object rotates, said first means mounted on a second means comprising a rotatably mounted framework adapted to rotate said first means and said object about a second axis of rotation in a direction such that the second axis of rotation of the said first means and said object is approximately perpendicular to the first axis of rotation of said object, a workpiece yieldingly mounted for contact with the surface of said object as it rotates about said first and second axes of rotation, and means for coordinating the mechanical movement of said first and second means such that the entire surface of said object can be contacted with said workpiece.

6. The machine of claim 5 wherein each pair of said rolls is carried by and spaced by a common central shaft.

7. The machine of claim 6 including supporting means rigidly connecting the shafts of two pairs of rolls forming opposite planes of said octahedral configuration.

8. The machine of claim 7 where said rigidly connected pairs of shaft spaced rolls are pivotally mounted on said rotatably mounted framework, and including means for pivoting said rigidly connected pairs of shaft spaced rolls to widen and narrow the octahedral configuration of rolls.

9. The machine of claim 5 where said workpiece is a rotary cutter disc.

10. The machine of claim 8 wherein the circumferal surfaces of said shaft spaced rolls are tapered in a direction central to said octahedral configuration, said surfaces further having embedded therein a plurality of spikes adapted to penetrate the surface of the object upon which work is being performed.

* * * * *